United States Patent [19]

van Gerwen et al.

[11] Patent Number: 4,573,169
[45] Date of Patent: Feb. 25, 1986

[54] COMMUNICATION SYSTEM FOR BI-PHASE TRANSMISSION OF DATA AND HAVING SINUSOIDAL LOW PASS FREQUENCY RESPONSE

[75] Inventors: Petrus J. van Gerwen; Wilfred A. M. Snijders, both of Eindhoven, Netherlands

[73] Assignee: U.S. Philips Corporation, New York, N.Y.

[21] Appl. No.: 560,767

[22] Filed: Dec. 12, 1983

[30] Foreign Application Priority Data

Dec. 16, 1982 [NL] Netherlands ................ 8204856

[51] Int. Cl.$^4$ ............... H04B 1/66; H03C 3/00; H03D 3/00
[52] U.S. Cl. ................... 375/55; 375/87; 375/101; 360/42
[58] Field of Search .......... 375/55, 57, 60, 87, 375/101, 103, 11, 18; 178/63 A, 63 B, 63 C, 63 E, 69 R, 69 N; 360/42, 44

[56] References Cited

U.S. PATENT DOCUMENTS

| | | | |
|---|---|---|---|
| 3,441,921 | 4/1969 | Jacoby | 360/42 |
| 3,892,916 | 7/1975 | Boulter | 375/57 |
| 4,123,710 | 10/1978 | Stuart et al. | 375/18 |
| 4,142,065 | 2/1979 | Tannhäuser | 375/55 |
| 4,313,203 | 1/1982 | van Gerwen et al. | 375/17 |
| 4,317,212 | 2/1982 | van Gerwen et al. | 375/20 |

OTHER PUBLICATIONS

"Differentiate", Data Communications Dictionary, Charles J. Sippl, van Nostrand Reinhold Co., 1976.

*Primary Examiner*—Robert L. Griffin
*Assistant Examiner*—Raymond C. Glenny
*Attorney, Agent, or Firm*—Thomas A. Briody; William J. Streeter; Leroy Eason

[57] ABSTRACT

A data communication system for transmission of bi-phase signals modulated by data symbols and in which the signals are filtered in accordance with a frequency response which approximates zero at 0 $H_z$ and at and exceeding the frequency 3/(2T) $H_z$ and which has an approximately sinusoidal variation between those frequencies, T being the symbol interval. This filter characteristic minimizes intersymbol interference and improves the signal-to-noise ratio. The requisite filtering may be provided in the receiver or in part in the receiver and in part in the transmitter of the communication system.

4 Claims, 17 Drawing Figures

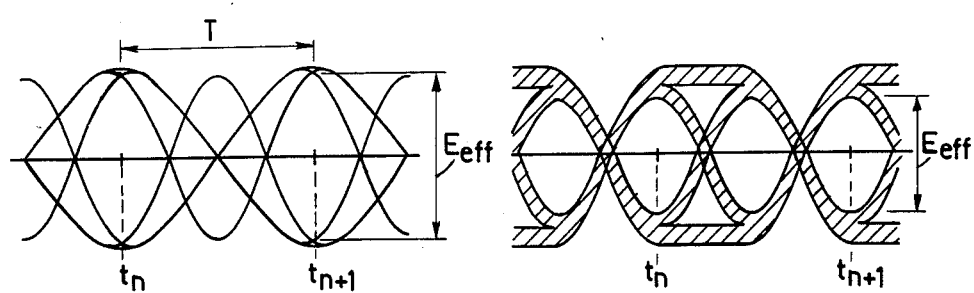
FIG.6a  FIG.6b
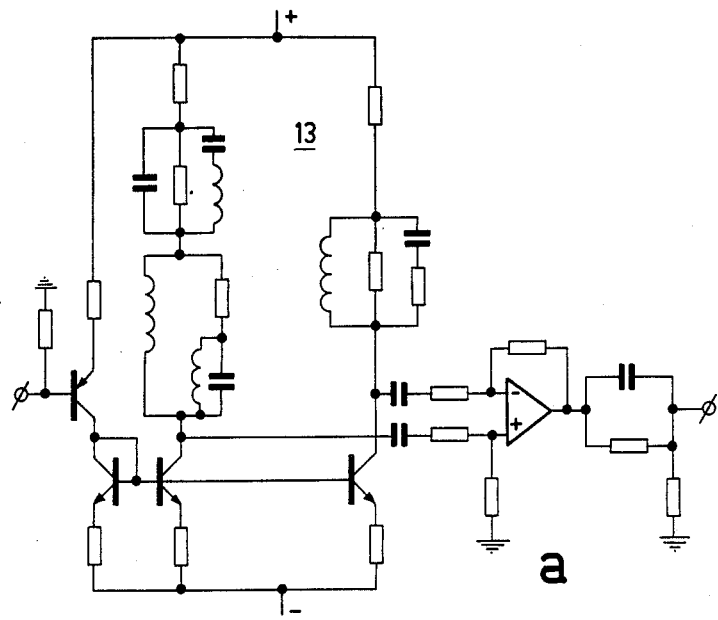
a
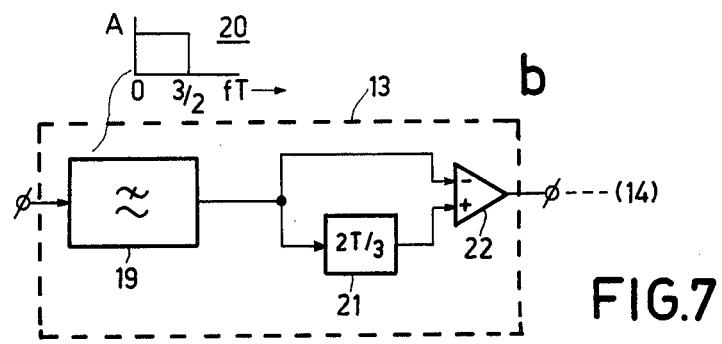
FIG.7

COMMUNICATION SYSTEM FOR BI-PHASE TRANSMISSION OF DATA AND HAVING SINUSOIDAL LOW PASS FREQUENCY RESPONSE

BACKGROUND OF THE INVENTION (1) Field of the Invention

The invention relates to a transmission system for transmitting binary data symbols in synchronous consecutive symbol period intervals having a duration of T seconds, and more specifically to a transmission system in which each data symbol is converted into a bi-phase symbol whose waveform in an interval T is given by one cycle of a carrier having a frequency 1/T or a carrier whose phase is shifted through 180° relative thereto, depending on the modulating binary data signal.

The power spectrum of such a bi-phase modulated signal has a zero at the frequencies 0 Hz and 2/T and a maximum between 0 Hz and 1/THz in the region of the frequency 1/T. Bi-phase modulation is used inter alia in those cases in which the transmission system, the physical transmission medium included, is not suitable, or is poorly suitable, for the transmission of the d.c. components and the low frequencies of the signal. The bi-phase modulated signal contains little energy at the low frequencies. For which reason a high-grade detection of the bi-phase signal is possible in the absence of these frequencies in the transmitted signal.

In addition the bi-phase modulated signal comprises sufficient clock information to guarantee simple generation of a clock signal at the receiving end.

(2) Description of the Prior Art

Transmission systems for transmitting binary data symbols in which the data symbols are transmitted in non-modulated form, for example in the form commonly referred to as "non-return-to-zero" (NRZ) symbols, make efficient use of the available bandwidth. The power spectrum of such an NRZ-signal has its maximum at zero frequency and a zero at the frequency 1/T. The frequency 1/T corresponds to the symbol frequency of the data signal to be transmitted and is usually designated the bit rate.

As is known, a (theoretical) bandwidth of 1/(2T) is sufficient for the undistorted transmission of NRZ-signals. Generally, the receive filter of such a system will be in the form of a Nyquist-1 filter having a cut-off frequency equal to half the bit rate and having a frequency response which extends to the bit rate and is zero thereabove.

Known disadvantages of the use of NRZ-signals in data transmission systems are on the one hand the absence of adequate clock information to enable simple and reliable clock generation at the receiving end and on the other hand the presence of a considerable amount of low-frequency information in the transmitted signal. As a result thereof, in those cases in which the transmission system, the physical transmission medium included, is not suitable, or is poorly suitable, for the transmission of these low frequencies, for example because of the presence of transformers or high-pass filters, a serious distortion of the received pulses will occur, which significantly interferes with a reliable detection of the signals.

Bi-phase modulation is one of the known methods of transmitting binary data signals without the above-described disadvantages of the presence of a d.c. component and low-frequencies, and with the advantage of sufficient clock information. In principle bi-phase modulation is suitable for use in transmission systems in which suppression of the low frequencies in the signal to be transmitted occurs. However, bi-phase modulation doubles the signalling rate relative to the original data signal, which is accompanied by an increase of the required frequency band. With bi-phase modulation this frequency band extends in principle from 0 Hz to frequency 2/T so that generally for bi-phase modulated signals the receive filter will be formed by a Nyquist-1 filter having a frequency response which extends to twice the bit rate and which is zero thereabove.

The transfer function F(1) of a Nyquist-1 filter for bi-phase modulated signals is, for example, given by:

$$F(\omega) = \omega \cdot \tan^{-1}(\omega T/8) \text{ for } |\omega| \leq 4\pi/T \quad (1)$$
$$0 \text{ for } |\omega| > 4\pi/T$$

where $\omega = 2\pi f$ is the angular frequency.

Such a Nyquist-1 filter is optimal as regards the detection of the signals without intersymbol interference, but is less optimal as regards the signal-to-noise ratio. Thus, the above filter has an equivalent noise bandwidth which is twice the noise bandwidth of the customary receive filter having a Nyquist-1 characteristic for non-modulated NRZ-symbols. In the case of white noise at the input, this results in a 3 db loss in signal-to-noise ratio compared with NRZ-transmission.

SUMMARY OF THE INVENTION

The invention has for its object to provide a transmission system of the type set forth in the preamble, in which an optimum detection of the data symbols at the receiving end is possible both as regards the intersymbol interference and as regards the signal-to-noise ration, which detection is, to a very high extent, independent of the frequency response for low frequencies of the transmission system, the physical transmission medium included, whereas the width of the required frequency band of the transmission system remains limited to 1.5 times the bit rate.

According to the invention, the transmission system is characterized in that the transmission system comprises means for filtering the bi-phase symbols in accordance with a frequency response which has a zero at the frequency zero, approaces the value zero for frequencies exceeding the frequency 3/(2T) and has at least an approximately sinusoidal variation between the said frequencies zero and 3/(2T).

SHORT DESCRIPTION OF THE FIGURES

FIG. 1 is a block diagram of a first embodiment of a transmission system according to the invention;

FIGS. 2a–c show waveforms occurring in the transmission system shown in FIG. 1;

Figure 1:
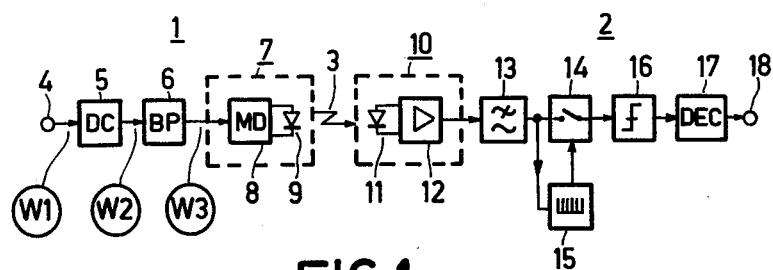
Figure 3:
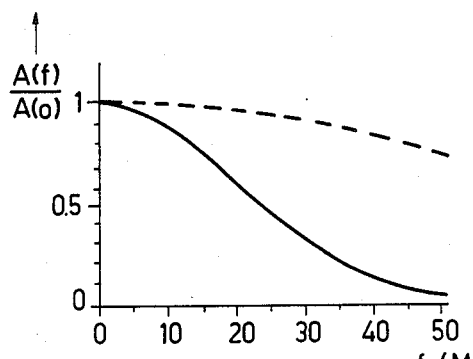
FIG. 3 shows the (relative) amplitude-versus-frequency characteristic of 5 kms long optical fibre link with an LED transmitter.
Figure 8:
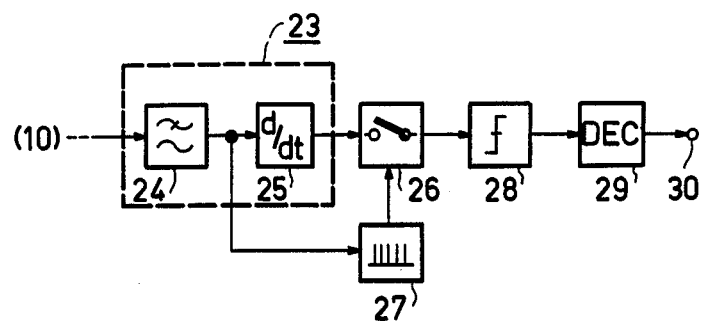
Figure 9:
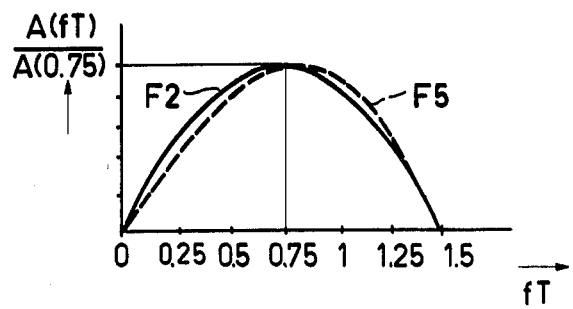
Figure 10:
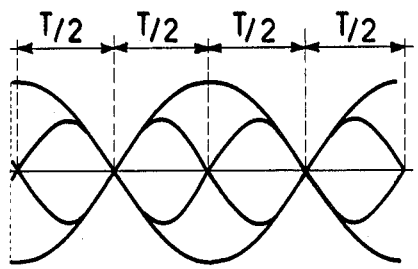
Figure 11:
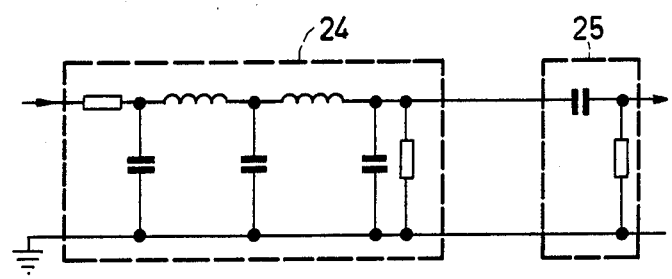
Figure 12:
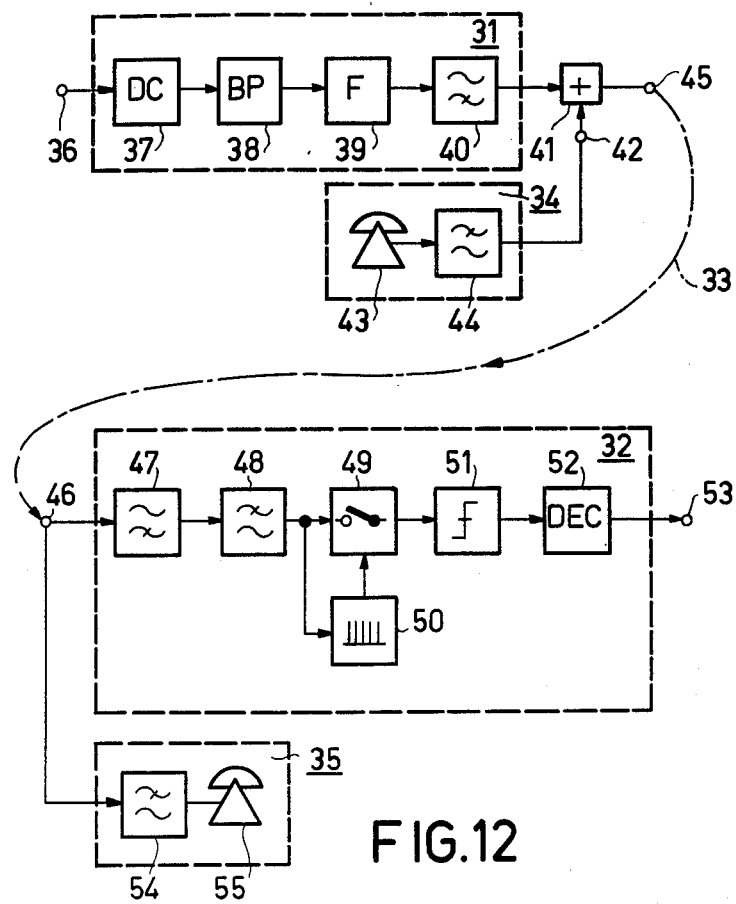
Figure 13:
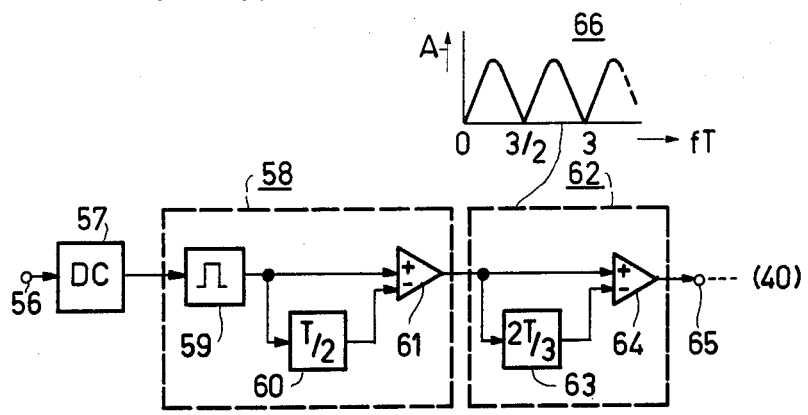

FIGS. 6a–b show the respective eye patterns of a transmission via an optical fibre link having a frequency characteristic as shown in FIG. 3, but with the low-frequencies being suppressed;

FIGS. 7a–b show, respectively, a direct implementation of a receive filter in accordance with equation (2) and an alternative embodiment of this filter, for use in the transmission system shown in FIG. 1;

FIG. 8 shows a block diagram of an alternative receiver for use in the transmission system shown in FIG. 1;

FIG. 9 shows some filter characteristics of the receive filter;

FIG. 10 shows the eye pattern of the output signal of the low-pass filter with the cosinusoidal transfer characteristic in the receiver of FIG. 8;

FIG. 11 shows an embodiment of the receive filter in accordance with the relation (5) for use in the receiver of FIG. 8;

FIG. 12 is a block diagram of a second embodiment of a transmission system according to the invention; and FIG. 13 is a block diagram of a data transmitter for use in the transmission system as shown in FIG. 12.

REFERENCES (1) "Fundamentals of optical fiber communications", M. K. Barnoski, (editor); chapters 5 and 6, Academic Press. Indc.

(2) "Manual of Fibre Optics Communication", J. D. Archer; pp. 24–25; published by ITT Components Group, no. 5191/2571E ed. 2.

(3) "Designer's Guide to Fibre Optics" Compilation EDN Magazine; parts 1 and 2; Cahners Publishing Company, Boston.

(4) "Optical Fiber Telecommunication", S. E. Miller and A. G. Chynoweth (editors); pp. 28–29 and Chapter 4; Academic Press. Inc.

DESCRIPTION OF A FIRST EMBODIMENT

The transmission system shown in FIG. 1 is used to transmit binary data symbols from a transmitter 1 to a receiver 2 via a transmission medium 3. In this example the transmission medium 3 is an optical fibre.

The transmitter 1 has input 4 to which binary data symbols of the NRZ-type, with symbol period intervals of T seconds, denoted bits hereinafter, can be applied. The bits are differentially encoded in an encoder 5 and thereafter applied to an encoding network 6 to obtain a bi-phase modulated signal.

The bi-phase modulated signal W3 thus obtained is applied to an optical transmitter 7, comprising a modulator 8 and a light-emitting diode (LED) 9, whose luminous flux is modulated by the modulator 8.

Figure 2:
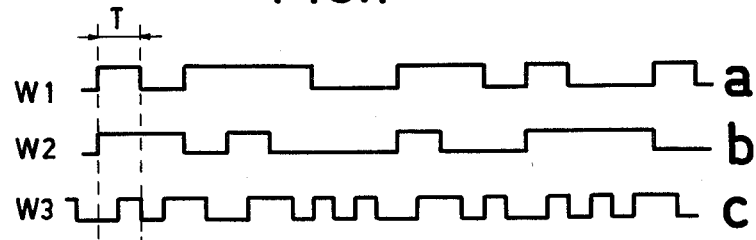

The waveforms W1, W2 and W3 occurring at different points in the transmitter 1 in the presence of a typical input signal, are illustrated in FIGS. 2a–2c.

The receiver 2 comprises an optical receiver 10 formed by a light-sensitive detector diode 11 and a pre-amplifier 12. Coupled to the output of the pre-amplifier is a receive filter 13, followed by a sampling switch 14 which is controlled by a clock signal circuit 15 in synchronism with the received data signals. The clock signal circuit 15 obtains the synchronizing information from the transmitted data signal available at the output of the receive filter. A polarity detector 16 for determining the polarity of each received bit is connected to the sampling switch 14. The output signal of this polarity detector is applied to a differential decoder 17, whereafter the original data symbols become available again at an output 18 of receiver 2.

The optical portion of the transmission system shown in FIG. 1, as formed by the optical transmitter 7, the fibre optic transmission medium 3, and the optical receiver 10, normally has an amplitude-versus-frequency characteristic whereby both the low and the high frequencies of the spectrum of the signal to be transmitted are suppressed.

Bandwidth limitation for the low frequencies is obtained particulary by the customary high-pass filters in the optical receiver 10, which are used on the one hand to reduce the equalization requirements for the low frequencies of the frequency characteristic of the pre-amplifier 12 if the latter comprises an integrating input stage followed by a differentiating equalizing network, and on the other hand to eliminate drift due to fluctuations in the dark current of the detector diode 11 or the semiconductor characteristics of the active components in the amplifier (see, for example, References 1 and 2).

Bandwidth limitation for the high frequencies predominantly occurs as a result of the differences in transit times through an optical fibre for the constituent optical wavelengths of the light transmitted by the LED, particularly for the region known as the "850 nm" wavelength range. These differences in the transit times result in a distortion of the received pulses which is known as intramode or material dispersion of the optical fibres (see, for example, References 3 and 4). To illustrate the bandwidth limitation due to the material-dispersion, FIG. 3 shows the (relative) amplitude characteristic A(f)/A(o) of a 5 kms-long fibre optical link for the case in which a LED-transmitter is used in the 850 nm wave length range with a spectral width of 40 nm. By way of reference, the dotted curve in FIG. 3 shows the corresponding amplitude characteristic when a substantially monochromatic light source is used such as, for example, a laser diode.

In order to eliminate as much as possible the disturbing influence of the pulse distortion caused by the above-described band-width limitations, and also to improve the signal-to-noise ratio of the signal and consequently to obtain an improved quality of the detection of the received data symbols, the transmission system for optical communication as shown in FIG. 1 comprises means arranged according to the invention for the purpose of filtering the bi-phase modulated signal and being formed by a receive filter 13, whose frequency characteristic has a zero at the frequency 0, approaches the value zero above the frequency $3/(2T)$ and has at least an approximately sinusoidal variation between these two frequencies.

If the transfer characteristic $H(\omega)$ of the receive filter 13 is written:

$$H(\omega) = \begin{cases} j \cdot \sin(\omega T/3) & \text{for } |\omega| \leq 3\pi/T \\ 0 & \text{for } |\omega| > 3\pi/T \end{cases} \quad (2)$$

then using the expression $$B(\omega) = \frac{\sin^2(\omega T/4)}{j\omega/2} \quad (3)$$

for the amplitude spectrum $B(\omega)$ of the bi-phase modulated signal, it can be derived that the amplitude spectrum $R(\omega)$ of the signal at the input of the sampling switch 14 in the case of an ideal transmission medium is given by:

$$R(\omega) = \begin{cases} \dfrac{2\sin^2(\omega T/4)\sin(\omega T/3)}{\omega} & \text{for } |\omega| \leq 3\pi/T \\ 0 & \text{for } |\omega| > 3\pi/T \end{cases} \quad (4)$$

Figure 4:
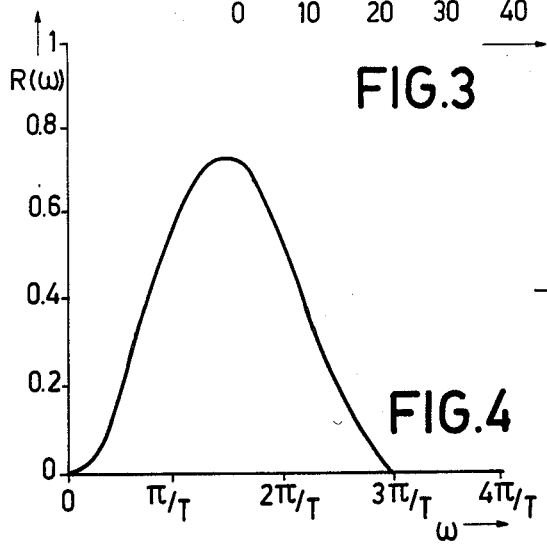
FIG. 4 illustrates the spectrum R(ω) of the signal present at the output of the receive filter 13 in the transmission system shown in FIG. 1.

FIG. 4 shows the spectrum $R(\omega)$ in accordance with equation (4).

Figure 5:
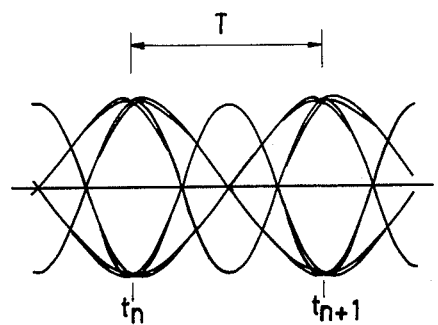
FIG. 5 shows the eye pattern of the signal present at the output of the receive filter 13 in the transmission system shown in FIG. 1, in the case of an ideal transmission medium.

The signal at the input of the sampling switch 14 has at the equidistant instants $t_n = nT$ ($n = \ldots, -2, -1, 0, 1, 2, \ldots$) only a negligible intersymbol interference. This is illustrated by the eye pattern, shown in FIG. 5, of the output signal of the receive filter 13. This Figure shows that a perfect binary detection of the received symbols by means of the sampling switch 14 is possible at the sampling instants $t_n, t_{n+1}, \ldots$.

It can be demonstrated that when using means for filtering the bi-phase symbols according to the invention in the form of a receive filter 13 having a transfer characteristic in accordance with equation (2) it is possible, in the case of white noise, to obtain a gain in the signal-to-noise ratio of about 2.5 dB in the signal applied to the sampling switch compared to the above-mentioned customary manner of Nyguist-1 filtering with a transfer characteristic in accordance with equation (1). Surprisingly, the transmission system according to the invention approaches to within approximately 0.5 dB the signal-to-noise ratio of a (hypothetical) system with non-modulated NRZ-transmission whereas furthermore in the transmission system according to the invention important additional advantages are realized as regards the clock information content and the insensitivity to the suppression of the low signal frequencies.

To illustrate the above-mentioned advantageous properties of the transmission system according to the invention as regards the insensitivity of the quality of the detection to the suppression of of the low signal frequencies, FIGS. 6a–b show the respective eye patterns at the input of receive filter 13 of a transmission system with bi-phase encoding and filter means according to the invention having a transfer characteristic given by relation (2), and of a transmission system using bi-phase encoding and the customary filtering in accordance with equation (1), for the case of data transmission via a 5 kms-long optical fibre link having a transfer characteristic as shown in FIG. 3, an ideal high-pass filter for suppressing the low-frequencies also being applied with a cut-off frequency equal to 10% of the bit rate. The hatched portion of the eye patterns shown indicates the spread of the signal transitions due to the intersymbol interference introduced by the bandwidth limitation. Numerical evaluation of the resulting ratio "effective eye opening $E_{eff}$ versus noise power" of the eye pattern evidence a gain in signal-to-noise ratio of the system according to the invention of about 3 db relative to the customary system. This gain results partly from the signal-to-noise ratio improvement described in the foregoing due to the filter means according to the invention and partly from the reduced sensitivity to the creation of intersymbol interference caused by cut-off of the low signal frequencies, thanks to the second-order spectral zero introduced by the filter means according to the invention at the frequency zero, as is also indicated by relation (4) and is further graphically illustrated in FIG. 4.

Embodiments of the receive filter 13 having a transfer characteristic in accordance with relation (2) are shown in FIGS. 7a–b. FIGS. 7a shows a direct realization of the desired characteristic. FIG. 7b shows an embodiment of a receive filter having the required transfer characteristic in accordance with equation (2), formed by a cascade arrangement of a low-pass filter 19 having a uniform frequency characteristic as illustrated at 20, and a delay network 21 having a time delay equal to $2T/3$. The output signals of both low-pass filter 19 and delay network 21 are applied to a difference producer 22 to obtain the output signal of receive filter 13 which is applied to sampling switch 14. The determination of the component values of the filters at a given cut-off frequency is within the grasp of the average person skilled in the art.

The block diagram of an alternative receiver for use in the transmission system of FIG. 1 is shown in FIG. 8. This receiver comprises a receive filter 23 formed by a low-pass filter 24 having a transfer characteristic in accordance with $\cos(\omega t/6)$ between the frequencies zero and $3/(2T)$ and zero outside this frequency range and a differentiator 25 having a transfer function $j\omega$. The output signal of the differentiator 25 is applied to a sampling switch 26 which is controlled by a clock signal circuit 27 in synchronism with the received data symbols. The clock signal circuit 27 obtains the synchronizing information from the received data signal, more specifically from the output signal of low-pass filter 24. A polarity detector 28 for determining the polarity of each received bit is connected to sampling switch 26. The output signal of polarity detector 28 is applied to a differential decoder 29 whereafter the original data symbols are available again at an output 30 of the receiver.

The receive filter 23 of the receiver shown in FIG. 8 has a transfer function $G(\omega)$ in accordance with:

$$G(\omega) = \begin{matrix} j\omega \cdot \cos(\omega t/6) & \text{for } |\omega| \leq 3\pi/T \\ 0 & \text{for } |\omega| > 3\pi/T \end{matrix} \quad (5)$$

Compared to a receive filter in accordance with equation (2), only a small loss in signal-to-noise ratio of about 0.2 dB is obtained when a receive filter in accordance with equation (5) is used. FIG. 9 shows the moduli of the filter characteristics in accordance with the equations (2) and (5) by means of the curves F2 and F5, respectively.

In the receiver shown in FIG. 8 the synchronization of the clock required for sampling switch 26 can be determined in a simple way and with a high quality with the aid of clock signal circuit 27. Namely, the signal at the output of low-pass filter 24, from which the synchronizing information is obtained, comprises equidistant zero transitions spaced apart by $T/2$ seconds, as illustrated by the eye pattern of the signal, shown in FIG. 10. A reliable clock signal can be derived therefrom in known manner by means of a zero transition detector (not shown) followed by a phase-locked loop (also not shown). Deriving the clock signal from the data signal does not form part of the present application.

FIG. 11 shows an embodiment of the receive filter 23 of the alternative receiver shown in FIG. 8 which has a transfer function in accordance with equation (5) and curve F5 in FIG. 9. This filter is formed by the cascade arrangement of the low-pass filter 24 having a transfer function $\cos(\omega T/6)$ and the differentiator 25 having a transfer function $j\omega$. The determination of the component values of the filter is within the grasp of the average person skilled in the art.

DESCRIPTION OF A SECOND EMBODIMENT

The transmission system shown in FIG. 12 used for the transmission of binary data symbols from a data transmitter 31 to a data receiver 32 via a transmission medium 33, while simultaneously a baseband signal, for example in the form of a telephone signal, is transmitted from a baseband transmitter 34 to a baseband receiver 35 via the same transmission medium 33. In this example, the transmission medium 33 is formed by one or more sections of a cable of the public telephone network and may comprise transformers.

The data transmitter 31 has an input 36 to which binary data symbols of the NRZ-type with symbol period intervals of T seconds, denoted bits hereinafter, can be applied. The bits are differentially encoded in an encoder 37 and thereafter applied to an encoding network 38 to obtain a bi-phase modulated signal.

The bi-phase modulated signal thus obtained is applied to the cascade arrangement of a transmit filter 39 and a simple high-pass filter 40. The low frequencies in the spectrum of the bi-phase modulated output signal of the encoding network 38 is suppressed by means of the filter 39 and 40 such that an undisturbed transmission of an independent baseband signal is possible in the frequency band thus released.

To combine the two independent signals, the output signal of the data transmitter 31, i.e. the output signal of the high-pass filter 40, is connected to an adder circuit 41, which further has a second input 42 to which the output signal of the baseband transmitter 34 is applied. In the present example, the baseband transmitter 34 is in the form of a telephone signal generator 43, whose output signal is applied to the input 42 of adder circuit 41 via a low-pass filter 44. The output 45 of adder circuit 41 is coupled to the transmission medium 33.

At the receive side, the transmission medium 33 is coupled to an input 46 to which both the data receiver 32 and the base-band receiver 35 are connected. The data receiver 32 comprises a high-pass filter 47 to suppress the baseband signal. The output signal of high-pass filter 47 is applied to a receive filter 48, to which a sampling switch 49 is connected which is controlled in synchronism with the received data signals by a clock signal circuit 50. The clock signal circuit 50 obtains the synchronizing information from the transmitted data signal available at the output of receive filter 48. A polarity detector 51 for detecting the polarity of each received bit is connected to sampling switch 49. The output signal of polarity detector 51 is applied to a differential decoder 52, whereafter the original data symbols become available again at an output 53 of the data receiver 32.

The received signal present at signal input 46 of the receiver is also applied to the baseband receiver 35 which in the present example is in the form of a receiver arranged for receiving a telephone signal. The baseband receiver 35 comprises a low-pass filter 54 to suppress the frequency components of the data signal located outside the speech band. Finally, the output signal of low-pass filter 54 is applied to the telephone signal receiver 55. It should be noted that in the present example only a one-way link is shown. In known manner, a similar transmission system is present in the opposite direction.

Similarly to the first embodiment an optimum detection of the data symbols at the receiving end is obtained both as regards the intersymbol interference and as regards the signal-to-noise ratio, by using in the transmission system for the data signals means for filtering the bi-phase symbols with a frequency response which has a zero at the frequency zero, approaches the value zero for frequencies exceeding the frequency $3/(2T)$ and has at least an approximately sinusoidal variation between the said frequencies zero and $3/(2T)$.

In the present example, these filter means are divided between the transmitter and the receiver, more specifically in the form of the transmit filter 39 and the receive filter 48. The frequency responses of the transmit filter 39 and the receive filter 48 are chosen such that a signal spectrum in accordance with the equation (4) is present at the input of the sampling switch 49.

As has been demonstrated above, a perfect binary detection of the received data symbols in possible in the event in which the signal spectrum in accordance with equation (4) is present at the input of the sampling switch 49. It has also been demonstrated that the quality of this detection is hardly affected by the suppression of the low frequencies in the signal. Consequently, the use of high-pass filter 40 at the transmitter end and high-pass filter 47 at the receiver end for the transmission of the additional, independent baseband signal influences the quality of the detection only to a very small extent.

Preferably, the frequency response of transmit filter 39 is chosen such that at the output of transmit filter 39 a signal is obtained whose spectrum has a second-order zero at the frequency zero. Such a spectrum contains very little energy at the low-frequencies so that these frequencies can be adequately suppressed in the data signal by means of a simple high-pass filter 40 to enable an undisturbed transmission of an independent baseband signal.

For the sake of completeness, FIG. 13 shows an embodiment of a data transmitter for use in the transmission system shown in FIG. 12, a portion of the means for filtering the bi-phase symbols according to the invention being included in this transmitter. After having been differentially encoded in an encoder 57, the NRZ-signal at input 56 is applied to an encoding network 58 to obtain a bi-phase modulated signal. The encoding network 58 is shown here in greater detail and is formed by a cascade arrangement of a pulse shaper 59 and a linear network formed by a delay section 60 having a time delay equal to $T/2$ and a difference producer 61. Each binary symbol with a symbol period T at the output of the encoder 57 is converted by the pulse shaper 59 into a binary symbol having a symbol period $T/2$, which symbol is applied on the one hand directly and on the other hand delayed via the delay section 60 to the difference producer 61. Thus, bi-phase symbols are produced at the output of the difference producer 61, which are symbols are further applied to a transmit filter 62 for filtering.

In the example shown, the transmit filter 62 is formed by a linear network consisting of a delay section 63 having a time delay $2T/3$ and a difference producer 64, to which the bi-phase symbols are applied, both directly and via the delay section 63. The ultimate transmit signal which can be transmitted to a receiver via a transmission medium, possibly after the addition of an independent base-band signal, is produced at the output 65 of the difference producer 64, while in the receiver filtering is effected in accordance with the uniform low-pass characteristic, as shown in FIG. 7 at 20.

The linear network from which the transmit filter 62 is formed, has an amplitude characteristic with a sinusoidal variation as illustrated at 66. The zero at 0 Hz in this amplitude characteristic provides a second-order zero point at the frequency zero in the spectrum of the transmit signal. In addition, the characteristic provides in combination with the uniform low-pass characteristic of the filter at the receiving end a frequency response in accordance with expression (2) according to the invention.

Compared with the advantage that with the transmitter shown in FIG. 13 for use in the transmission system of FIG. 12, an undisturbed simultaneous transmission of an independent baseband signal is possible, there is only a small loss in signal-to-noise ratio. Compared to the transmission system shown in FIG. 1, in which the means for filtering the bi-phase symbols are wholly included at the transmitting end, this loss in signal-to-noise ratio is approximately 1 dB.

It should further be noted that in a practical embodiment of the transmitter shown in FIG. 13 the individual linear networks for encoding and filtering the signals occurring in the transmitter can be combined in one linear network.

What is claimed is:

1. A communication system for transmitting binary data symbols in synchronous, consecutive symbol period intervals having a duration of T seconds, comprising: a data transmitter for converting each data symbol into a transmitted bi-phase modulated signal whose waveform in an interval T is given by one cycle of a carrier having a frequency 1/T Hz and whose phase is shifted in accordance with the modulating data symbol; a data receiver for receiving the transmitted bi-phase modulated signal and deriving the data symbols therefrom; and circuit means for filtering the bi-phase modulated signal in accordance with a frequency response which approximates zero at 0 Hz, approximates zero for frequencies at and exceeding 3/(2T) Hz, and has an approximately sinusoidal variation between the said frequencies 0 Hz and 3/(2T) Hz.

2. A data receiver for use in a communication system as claimed in claim 1, characterized in that the circuit means for filtering the bi-phase modulated signal are arranged in the receiver between the input thereof for the received signals and a circuit for regenerating the received signals; said filtering circuit means comprising a cascade arrangement of a low-pass filter and a differentiating network; said low-pass filter having a transfer characteristic which is a maximum at 0 Hz, approximates zero for frequencies at and exceeding 3/(2T) Hz, and has a cosinusoidal variation between these two frequencies; said differentiating network having a transfer function $j2\pi/T$.

3. A communication system in accordance with claim 1, wherein said circuit means for filtering the bi-phase modulated signals are comprised in said data receiver.

4. A communication system in accordance with claim 1, wherein said circuit means for filtering the bi-phase modulated signals are comprised in part in the data receiver and in part in the data transmitter.

* * * * *

UNITED STATES PATENT AND TRADEMARK OFFICE
CERTIFICATE OF CORRECTION

PATENT NO. : 4,573,169
DATED : February 25, 1986
INVENTOR(S) : Petrus J. Van Gerwen et al It is certified that error appears in the above-identified patent and that said Letters Patent is hereby corrected as shown below:

In the Abstract, line 4, change "and" (second occurrence) to -- frequencies --.

Signed and Sealed this

Twenty-ninth Day of September, 1987

Attest:

DONALD J. QUIGG

*Attesting Officer*  *Commissioner of Patents and Trademarks*